United States Patent [19]

Pierson

[11] 4,260,070
[45] Apr. 7, 1981

[54] LATCH FOR BAIT BUCKET DOOR

[75] Inventor: Robert E. Pierson, Sugar Grove, Ill.

[73] Assignee: Plano Molding Company, Plano, Ill.

[21] Appl. No.: 130,697

[22] Filed: Mar. 17, 1980

[51] Int. Cl.³ .............................................. B65D 43/24
[52] U.S. Cl. ...................................... 220/335; 43/55; 43/56
[58] Field of Search ...................... 220/335; 43/55, 56; 49/386

[56] References Cited
U.S. PATENT DOCUMENTS 4,019,274  4/1977  Landell et al. ......................... 43/55
4,032,037  6/1977  Dubery ................................. 220/335

Primary Examiner—George T. Hall
Attorney, Agent, or Firm—Richard A. Zachar

[57] ABSTRACT

Latch for releasably holding spring-loaded door of live bait bucket in retracted position wherein the latch member comprises a one-piece molded plastic strip with a release button at one end, a resilient portion at the other end adapted to bear against an inner wall of the bait bucket so as to urge the bottom outwardly, a door-engaging hook, a retraction-limiting protrusion and suitable guide means.

1 Claim, 3 Drawing Figures

LATCH FOR BAIT BUCKET DOOR

BACKGROUND OF THE INVENTION

The present invention relates to a live bait bucket of the type used by fisherman when trolling for fish and, more particularly, to an improved latch and release mechanism for engaging and holding the access door of the bucket retracted in the open position.

Bait buckets of the type to which the present invention relates are containers for live bait, such as minnows, and water in which the bait can be kept alive. They are designed to be towed behind boats with outboard motors, and are used by fishermen when trolling at low speed. Such buckets are designed to float and be towed in a horizontal position, and each is generally provided with an access opening on the front, which faces upwardly when the bucket is in a floating or towed position.

It is customary to provide live bait buckets of this type with retractable, spring-loaded access doors, which are normally biased to the closed position, sealing the access opening against accidental loss of the bait. The door to such buckets usually retract inwardly so that the fishermen can push it open with one hand as he reaches into the bucket to get additional bait. It is helpful to provide means for latching the door in the open position, and other means for releasing the latch, thus causing the door to return, under spring pressure, to the closed position.

Because live bait buckets are partly submerged during use, their component parts are constantly exposed to possible water and moisture damage. Moreover, they are used under circumstances where it is important that they require a minimum of manual dexterity to open the door, to reach into the interior for bait and to release the latch to close the door.

SUMMARY OF THE INVENTION

The live bait bucket with which the latch of the present invention is adapted to be used is preferably a container with a top portion that serves as the forward end of the bucket when it is floating and being towed. The underside of the bucket is submerged when in use, and the upper side has an access opening that slopes toward the forward end. Thus, the fisherman sitting in the rear of the fishing boat may reach back, from time-to-time, into the bait bucket to get additional live bait. The access door is hinged at the forward end of the opening and retracts inwardly. The hinge is spring loaded to cause the door to close automatically when not latched in the retracted position. The latching mechanism is an elongated, molded plastic strip, slidably engaged in suitable guides within the bucket. It has in integral button portion at one end that protrudes from the bucket just above the door. The strip terminates at its other end in a resilient, arcuate tip that bears against an inside wall portion of the bucket so that when the button is depressed, the springy arcuate tip is slightly compressed, causing it to exert outward pressure on the strip, causing the button to return to its normal, extended position. The strip is provided with a hook-like protrusion which engages the door when fully retracted in the open position and is disengaged when the button is depressed.

It is a principal object of my invention to provide a simple, dependable and convenient latching mechanism for engaging, holding and releasing the access door to the interior of a live bait bucket.

It is another object of my invention to design such a latch mechanism which is rustproof and impervious to the effects of prolonged exposure to moisture and immersion in water.

It is a further object of my invention to provide such a latch means which is substantially foolproof and troublefree, and has other advantages over previously known latching mechanisms for live bait buckets, these and other objects being accomplished as hereinafter described, my preferred embodiment being shown in the accompanying drawing.

DESCRIPTION OF THE PREFERRED EMBODIMENT

Figure 1:
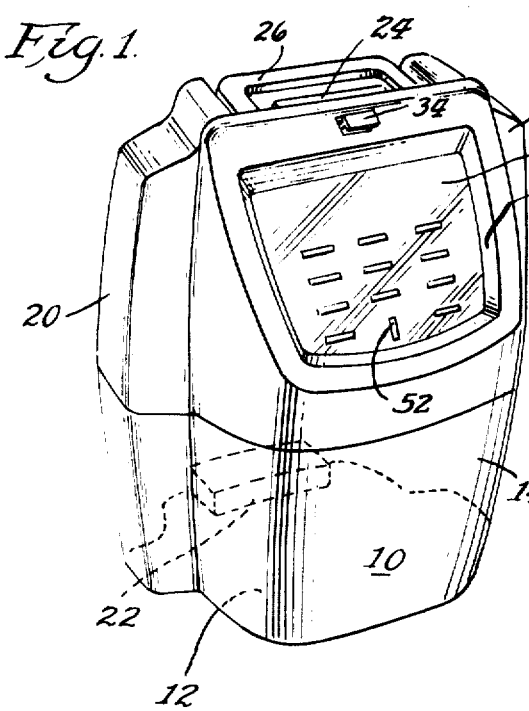
FIG. 1 is a perspective view of a live bait bucket incorporating the latch mechanism of my invention.
Figure 2:
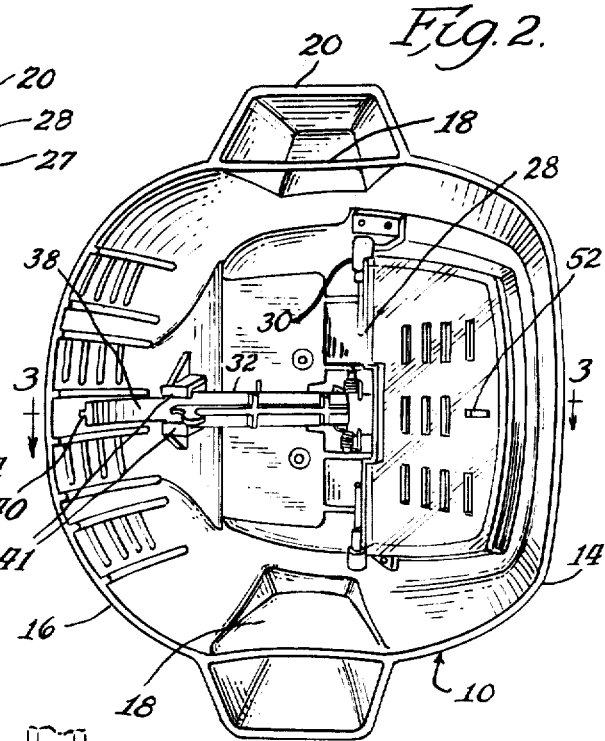
FIG. 2 is a view of the interior of the bait bucket of FIG. 1, as seen from the bottom, to show the latch member disposed within the bucket.

Referring now to the drawings, the bait bucket in which the improved latch mechanism is incorporated is indicated generally by the reference numeral 10, and is shown to consist of a body shell of generally bucket-like shape, molded of suitable plastic material, such as polyethylene. The bucket 10 includes a bottom wall 12 integral with upstanding walls including a front wall 14, a back wall 16 and opposed walls 18, the latter being provided with lengthwise pontoon-like protrusions or air chambers 20 which are sealed against entry of water and serve both to insure bouyancy and to stabilize the bucket in a horizontal floating position when floating or being towed. Additionally, a weight 22, as shown by the dotted lines in FIG. 1, provides further stability for the bucket 10, preventing it from capsizing. The bucket 10 has a top 24 of reduced dimension in relation to the bottom 12, the top 24 having a handle 26 that folds down against the top, but which may be raised for convenience in carrying and for attachment to a rope or hook for towing behind a fishing boat.

Near the top 24, the front wall 14 slopes as shown and is provided with an opening 27 which is normally closed by means of the door 28. The door is mounted on a hinge 30 so as to retract inwardly into the interior of the bucket 10 when it is opened. The hinge 30 is spring-loaded to hold the door 28 in its normally closed position, to safeguard the contents of the bucket 10 against accidental loss.

The latch mechanism, for selectively holding the door 28 in the open position, is an elongated, molded plastic strip 32, with a push button 34 at the outer end, integral with the strip 32 and protruding through a cooperating aperture 36 in the front wall 14. At its opposite end, the strip 32 has a somewhat resilient tail-like, arcuate extension 38, which is engaged in slidable bearing relation against the inner surface of the back wall 16, the points of contact being protuberances 40. The respective sides of the strip 32 are slidably engaged by guides 41, which cooperate with the aperture 36 to permit sliding movement of the strip 32.

Figure 3:
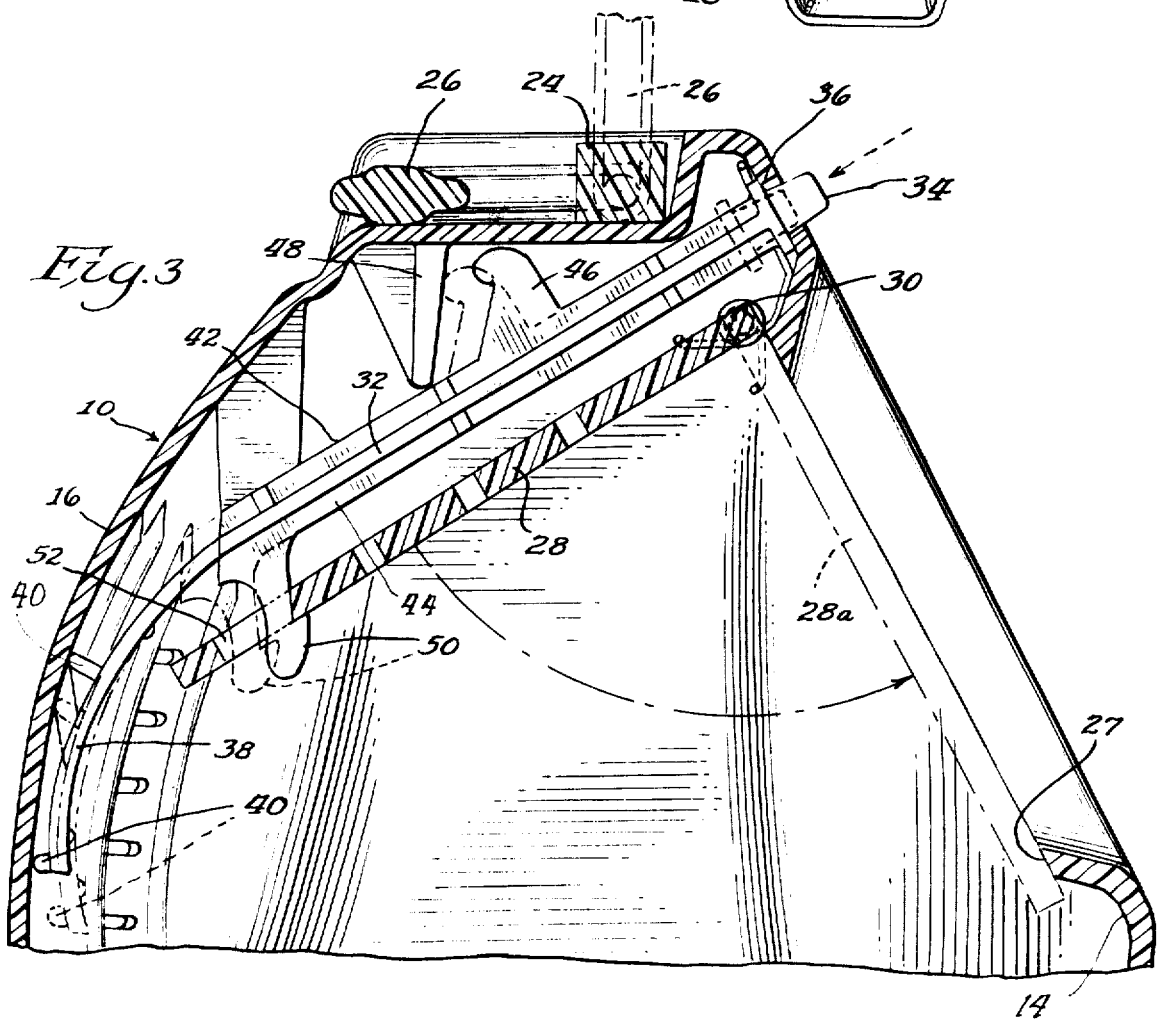
FIG. 3 is a sectional view on the line 3—3 of FIG. 2.

The strip 32 is molded with integral top and bottom ribs 42 and 44 which extend longitudinally from the button 34 to the extension 38 to provide stiffness. The top rib 42 has an upstanding portion 46 that cooperates with a stop member 48, depending downwardly from the top 24 to limit retraction of the strip 32. The bottom rib 44 has a downwardly protruding hook-like catch 50 which is adapted to engage a cooperating aperture 52 in the door 28 when the door is retracted to its full open position. As will be seen, catch 50 can be disengaged from the aperture 52 by pushing the button 34. When thus disengaged, the spring loading of the hinge 30 causes the door 28 to return automatically to the closed position (28a in FIG. 3). The spring portion of the hinge 30 is made preferably of phosphor bronze because of its excellent durability and resistance to rust or deterioration when subjected to prolonged water contact. The door 28 may be made of "see-through" acrylic, and the latch strip 32 is made of a long wearing plastic material known commercially as ABS.

When the bucket 10 to be used, a fisherman would press door 28 far enough inwardly to cause it to engage the catch 50. He would fill the bucket with the desired quantity of water and put in the minnows or other live bait that he planned to use. He would then press the button 34, causing the door 28 to snap closed. Then he would attach a towing rope to the handle 26, and tow the bucket 10 behind his boat while trolling. The boat would float horizontally, with the door 28 facing upwardly, in a convenient position for getting at the minnows inside. When the fisherman wanted a fresh minnow, he could reach back, press the door sufficiently to latch it in the open position, reach in for more bait, and then press the button to cause the door to close—all with one hand.

While I have shown my invention in a preferred form, it should be understood that my latch mechanism can be modified in various ways, such as for use with bait buckets or the like which differ considerably in shape from the container illustrated in the drawing, it being contemplated that such modifications can be made without departing from the spirit of my invention, the scope of which is to be determined by the appended claims.

I claim as my invention:

1. An improved latch means for selectively engaging and releasing an inwardly retractable access door to the interior of a container of the class described, which container has a front wall with an opening therein, an opposed rear wall and a connecting top wall interposed therebetween, which door is hinged to said front wall adjacent said opening and adapted to serve as a closure therefor, wherein said latch means comprises the combination of:

an elongated strip having a mid-section and opposed ends integral therewith;

said mid-section being relatively inflexible and having a longitudinally disposed guide portion and latching means adapted to engage cooperating means on said door;

one of said ends comprising a protruding portion adapted to be engaged in longitudinally slidable relation in a cooperating aperture in said front wall adjacent said opening and being operable by manual pressure to cause retraction of said strip;

the other of said ends comprising a relatively resilient extension adapted to bear in yieldable relation against said rear wall in such a manner as to urge said strip toward said aperture;

said guide portion being engageable in longitudinally slidable relation with cooperating guide means protruding from one of the walls of said container; and said latching means being disengageable from said cooperating means on said door when said trip is caused to retract.

* * * * *